United States Patent [19]

Derby

[11] Patent Number: 5,768,172
[45] Date of Patent: Jun. 16, 1998

[54] GRAPHIC SOFTWARE FUNCTIONS WITHOUT BRANCH INSTRUCTIONS

[75] Inventor: Herbert G. Derby, Boulder Creek, Calif.

[73] Assignee: Apple Computer, Inc., Cupertino, Calif.

[21] Appl. No.: 539,062

[22] Filed: Oct. 4, 1995

[51] Int. Cl.$^6$ .................................................. G06F 7/50
[52] U.S. Cl. .................................. 364/769; 395/565
[58] Field of Search ................................ 395/564, 565, 395/395, 702, 133, 135; 364/769

[56] References Cited

U.S. PATENT DOCUMENTS

| | | | |
|---|---|---|---|
| 4,747,046 | 5/1988 | Baum et al. | 395/565 |
| 5,499,326 | 3/1996 | Narayanaswami | 395/133 |
| 5,522,020 | 5/1996 | Narayanaswami | 395/133 |
| 5,563,991 | 10/1996 | Mahoney | 395/133 |

OTHER PUBLICATIONS

Sanna et al., On the Computation of Groups of Bounding Boxes for Fast Test of Objects Intersection, p. 685, IEEE.
Bryan Costales, C from A to Z, 1985, pp. 220–221, Prentice Hall.
D. M. Capper, Introducing C++ for Scientists, Engineers and Mathematicians, 1994, pp. 93–94, Spring Verlag, NY.

*Primary Examiner*—William M. Treat
*Assistant Examiner*—Patrice L. Winder
*Attorney, Agent, or Firm*—Sawyer & Associates

[57] ABSTRACT

A method for improving the execution speed of compare operations in graphic software functions running on a RISC processor. A branch instruction in a software function comparing the value of two variables is replaced with an inline compare instruction that encodes the result of the compare into a third variable using an arithmetic shift-left instruction. An inline choice instruction selects the value of one of the two variables using the value of the third variable as a mask. The inline compare and an inline choice instructions reduce processor stalls during execution.

30 Claims, 5 Drawing Sheets

MIN (A,B)

FIG. 3A

MAX (A,B)

GRAPHIC SOFTWARE FUNCTIONS WITHOUT BRANCH INSTRUCTIONS

FIELD OF THE INVENTION

The present invention relates to programming methods to optimize software execution, and more particularly to a method for programming software graphic functions without branch instructions to prevent processor stalls.

BACKGROUND OF THE INVENTION

In superscalar processors, such as reduced instruction set (RISC) processors, the ability to execute instructions in parallel and the use of simple instructions with rapid execution times yield high efficiency and throughput. How a software function or program is written, however, may have a major impact on the processor's performance.

For example, a branch instruction in the function's instruction stream often slows the processor's performance by causing the processor to discontinue execution along a sequential path and to jump or branch to another location. A branch instruction also causes delays when execution of instruction must wait because the instruction is dependent on the results of a previous instruction that is not finished being processed. This causes the processor to interrupt sequential execution, or stall because the processor must wait for the result of a pending instructions before determining which instruction to execute next.

An example of a function which can cause the processor to stall due to a branch instruction waiting for a result is a conventional implementation of the absolute value function (ABS). Given a variable, x, as input, the conventional ABS(x) function returns the positive value of the variable. The ABS(x) function is typically written using a branch instruction as follows:

if x<0 then
 x:=−x;
 return(x);

where the assignment statement "x:=−x" is conditionally executed based on the comparison of x<0, and where the "return(x)" statement is the statement branched to in the event x is greater than zero. Even though superscalar processors are capable of executing several different types of instructions in parallel the execution of a compare instruction, such as comparing the value of x with 0, may not complete before an attempt is made to execute the branch instruction, causing the processor to stall.

Some attempts have been made to reduce the number of branch instructions in software functions. One approach employed a computer to exhaustively try all instruction sequences to encode the absolute value function without a branch instruction in less than four instructions. The result of the computerized method of encoding the simple ABS function was successful. However, the method is inadequate for encoding larger more complex functions because the permutations of possible instruction combinations expand exponentially to the point where they may take years to solve.

In graphics processing, for example, many complex functions are used repeatedly to update images in a frame buffer. A frame buffer is a type of memory arranged as an array for storing the location and intensity of each pixel on a display screen. The display is updated from the contents of the frame buffer, which in turn, is updated by the processor. As updates from the processor to the frame buffer increase in frequency with faster clock speeds and faster processors, faster graphic routines are needed to reduce software bottlenecks.

Accordingly, what is needed is a generalized method to generate software functions without branch instructions. The present invention addresses such a need.

SUMMARY OF THE INVENTION

The present invention provides a method for reducing processor stalls when executing a software function, where the function includes a plurality of instructions. The method comprises encoding a comparison between a first value and a second value in a first instruction, where the first instruction provides a result of the comparison. The result of the comparison is then used to indicate if the first and second value are in a predetermined relationship, thereby enabling the comparison in the software function to execute sequentially. The method further comprises encoding the results of the first instruction into a third value, which operates as a mask, and selecting the first value or the second value based on the third value.

According to the system and method disclosed herein, a software function programmed according to the present invention executes faster than a traditional software functions due to the elimination of branch instructions and the reduction of processor stalls.

DESCRIPTION OF THE INVENTION

The present invention relates to an improvement in graphic software programming. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
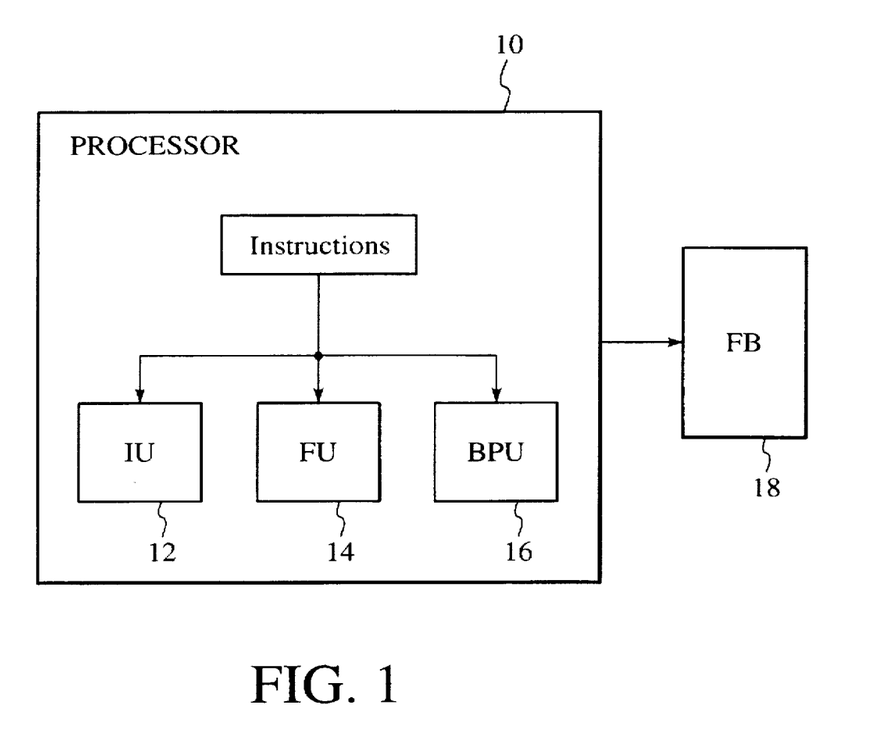
FIG. 1 is a block diagram of the hardware environment in which the software of present invention is compiled and executed.

FIG. 1 is a block diagram of the hardware environment in which the software of present invention is compiled and executed. The hardware includes a RISC processor 10 and a frame buffer 18 for storing graphics information. The processor 10 typically includes one or more execution units, such as an integer unit 12, a floating point unit 14, and a branch processing unit 16. When executing software functions, non-branch instructions are usually processed by the integer unit 12 or the floating point unit 14, while branch instructions are usually processed by the branch processing unit 16. Software functions are compiled and executed by the processor 10, and instructions pertaining to graphics information are used to update pixel values stored in the frame buffer 18.

The processor 10 is capable of executing several instructions in parallel. However, when executing dependent branch instructions, the branch unit 16 may have to wait for results from the execution units 12 or 14 before executing the dependent branch instructions.

As stated above, a computerized method has been employed to encode a conventional ABS function without branch instructions to speed execution. The result was the following function written in the "C" programming language, which accepts a variable x as a parameter, and returns the absolute value of x:

temp:=x;

temp:=temp>>31;

x:=(x^temp)−temp;

The variable temp is first assigned the value of x. Both x and temp are N bits in length and have a sign bit in the most significant bit. For example, a thirty-two bit variable is represented as $S_3 b_{30} bb \ldots b_0$, where "S" is the sign bit and a "b" is one bit. S contains a 0 when the variable is positive or zero and 1 when the variable is negative. The symbol ">>" in the second line denotes an arithmetic shift-left, which fills all bit positions in temp with the sign bit, and the result is stored in temp. The symbol "^" in the third line denotes a bitwise exclusive-Or. The expression x^temp means that the resulting value contains a 1 in each bit position where there is a 1 in either x or temp, but not both, and a 0 in every other bit position. If temp is all 1s, then x is inverted. If temp is all 0s, then x is unchanged. The final subtraction ensures that a positive value of x is returned by the function.

By examining the encoded absolute value function, applicant has recognized that the comparison of whether x is positive or negative may be encoded within the value of x itself using the arithmetic shift-left function. For example, a comparison of whether the variable A is positive or negative may be encoded as the boolean expression:

−(~(A>>31))

where the symbol "~" represents the one's complement of A, in which the resultant value contains a 1 in each bit position where A contains a 0, and 0 in each bit position where A contains a 1. If the value returned from the shift-left is all 1's, the value is changed to 0's or positive, and if the value was originally negative, the value is changed to 0's. The value the function is to return is 0 or 1, but the current value is 0 or negative one. The negative symbol "−" is provided to change the negative one to 1, zero remains zero.

A more efficient way to encode the comparison with the same result is the boolean expression:

(A>>31)+1

When the value of A is negative, the shift-left fills A with all 1s, and then a 1 is added to the value. Due to the addition, a value results of all 0's except the sign bit, which remains 1.

Encoding a comparison of whether a variable is positive or negative using a logical shift is helpful, but has limited applicability in software functions. For instance, many other functions used in computer graphics are required to compare the value of one variable with the value of a second variable.

Figure 2A:
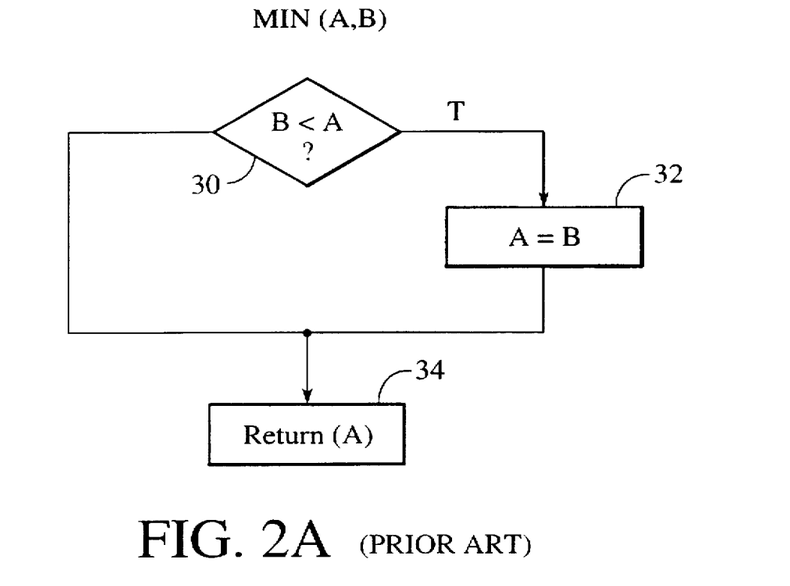
FIGS. 2A and 2B are flowcharts for conventional functions MIN(A, B) and MAX(A, B) that are written with branch instructions.
Figure 2B:
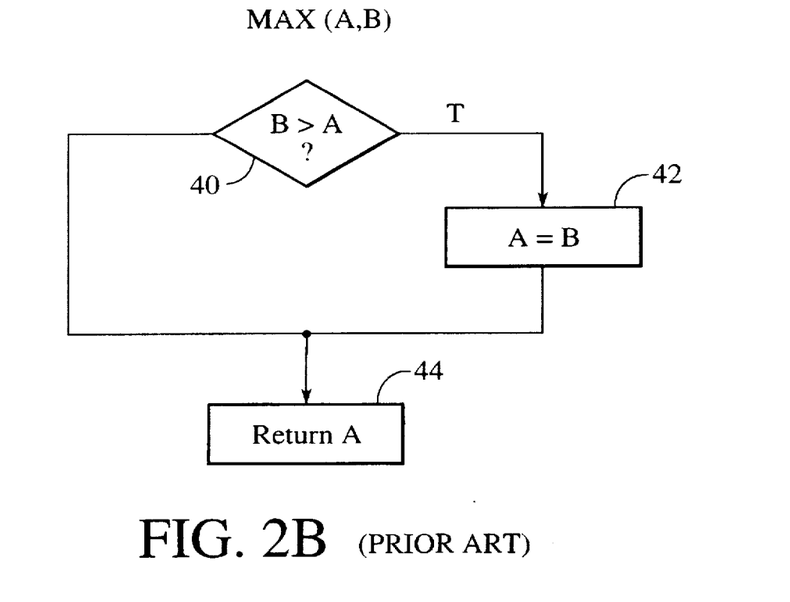

FIGS. 2A and 2B are flowcharts depicting two widely used conventional graphics functions that typically include a branch instruction to compare two variables. FIG. 2A is a flowchart of the minimum value function, MIN(A, B), which when passed two variables, A and B, returns the numerically smaller value. The value of B is compared the value of A in step 30. If B is less than A, then the function sets the value of A to B in step 32, and returns the value of A in step 34; The value of A remains the same when A is less than B. FIG. 2B is a flowchart of the maximum value function, MAX(A, B), which operates oppositely to the MIN(A, B) function by returning the numerically larger value of A and B. The flowchart is the same as for MIN(A, B) except that if the value of B is greater than A in step 40, then the value of A is set to the value of B in step 42 and returned in step 44. As shown in the above flowcharts, functions that compare two variables, such as A and B, typically use an "if" instruction to perform the compare, which is followed by one or more instructions that depend upon the result of the compare.

According to the present invention, the method of encoding a comparison of whether a variable is positive or negative has been expanded to encode compare statements generally, without the use of a branch instruction. Typical branch instructions that compare the value of two or more variables are rewritten using an arithmetic shift instruction to encode the comparison and save the result in a third variable in one instruction.

Given two variables A and B, the instruction encoding a comparison of A and B is described as:

T:=(A−B)>>31 where the third variable T is set to binary 0 when A is greater than B, and set to 1 when A is less than B. When A is greater than B, the resulting value of the subtraction is positive, and the shift-left function fills the value with 0s. If B is greater than A, then the resulting value is all 1s. In a preferred embodiment, A and B are both 32-bit variables. If A and B are N-bit variables, then the expression performs a shift-left of N-1 bits.

The above expression is called an inline compare because it performs a compare operation and stores the value of the compare all in the same instruction. Since no branch instruction is used, a function written with an inline compare executes sequentially.

The MIN and MAX functions discussed above are useful in graphics processing in which masks are often used. A mask is used to combine one image with a second image based on whether each bit position in the mask is a binary 0 or 1. For example, assume the frame buffer contains an image that is to be updated with a second image. For every position in mask that contains a 1, the corresponding values in frame buffer are to be replaced by the values of the second image. For every position in mask that contains a 0, the corresponding values in frame buffer are not to be changed.

If the set of values in frame buffer is represented by the variable A and the set of values of the second image is represented by the variable B, then the following boolean logic can be used to compose the new image:

(~mask & A)|(mask & B)

where "~" represent a NOT, "&" represents an AND, and "|" represents an OR. When mask equals 0, the expression returns the value A, and when mask equals 1, the expression returns the value B.

As used hereinafter, the above expression is called an inline choice because both the value of the mask is evaluated, and the selection of one of two variables is performed in one instruction without a branch instruction. In conventionally programmed functions, an "if" instruction is used to evaluate the value of the mask, and then A or B is selected depending on the outcome of the evaluation.

According to the present invention, the inline compare and the inline choice are combined to improve compilation and execution speed of compare operations in graphic software functions running on a RISC processor.

Figure 3A:
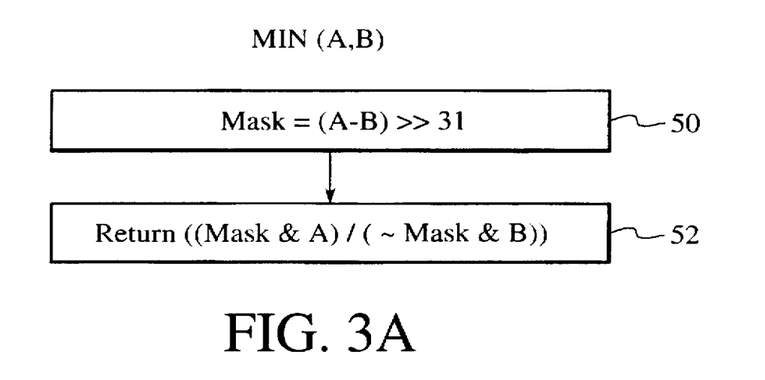
FIGS. 3A and 3B are flowcharts for the functions MIN(A, B) and MAX(A, B) written using the inline compare and inline choice instructions of the present invention.
Figure 3B:
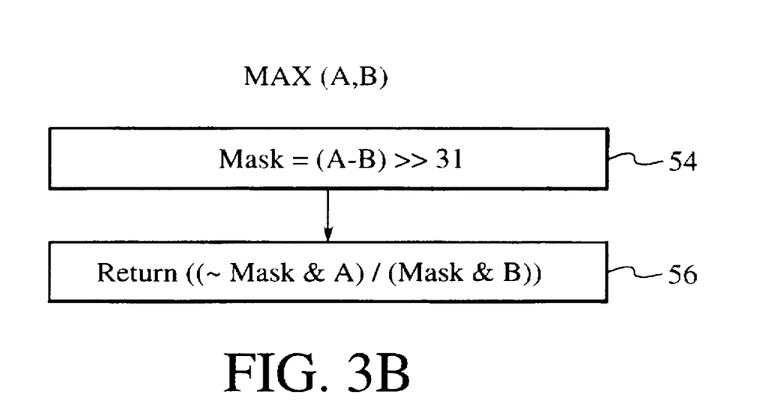

Referring to FIGS. 3A and 3B, flowcharts for the functions MIN(A, B) and MAX(A, B) are shown, respectively, both written using the inline compare and inline choice instruction of the present invention. In FIG. 3A, the inline compare instruction is used to compare the value of A to B in step 50, and the result of the compare is stored in the variable mask. If A is smaller, mask is set to 1s by the shift-left instruction. The value of the mask is then used to select the variable A in the inline choice instruction in step 52, and A is returned. If B is smaller, mask is set to 0s, and B is returned by the inline choice instruction in step 52. FIG. 3B for MAX(A, B) is similar to MIN(A, B) except that the inline choice in step 56 returns the opposite value because the "~" (NOT) operator is transposed in the inline choice in step 52 from that in the inline choice in step 56.

Comparing the flowcharts of FIGS. 2A and 3B with those in 3A and 3B illustrates that the implementations of the MIN and MAX functions according to the present invention execute sequentially without dependent branch instructions. The sequential execution of functions provided by the present invention significantly increases speed, especially in the more complex functions described below.

Figure 4A:
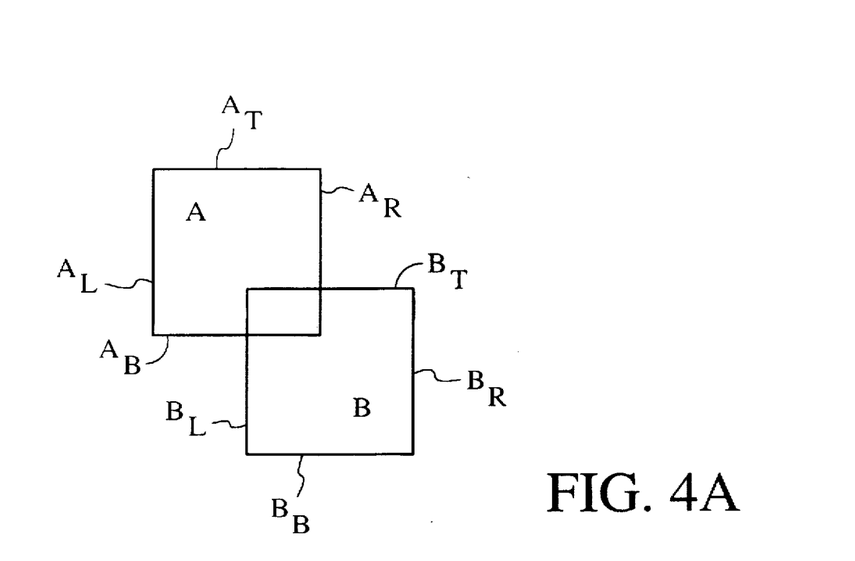
FIGS. 4A–4C depict graphic relationships between two rectangles A and B.
Figure 4B:
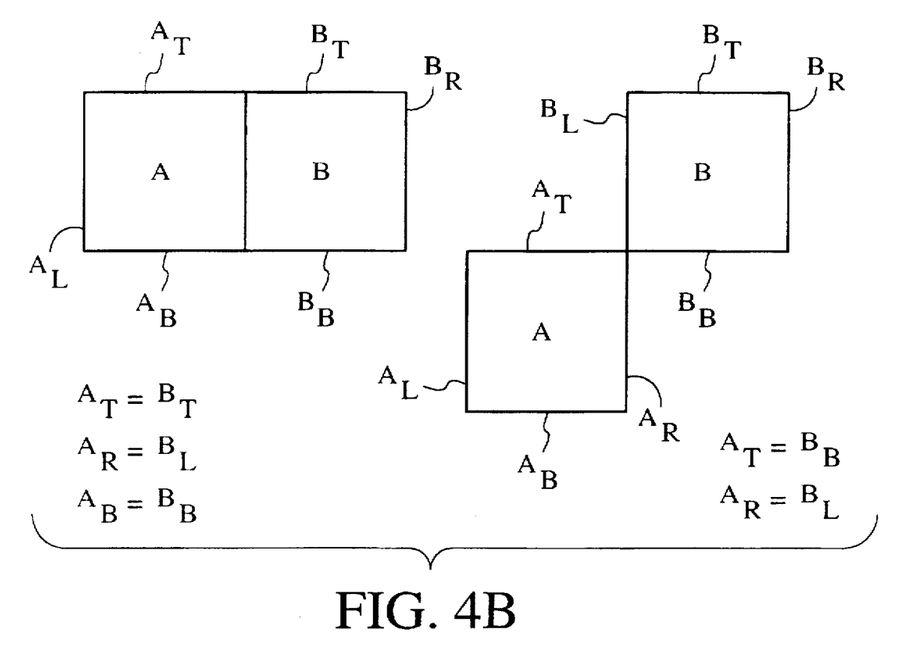
Figure 4C:
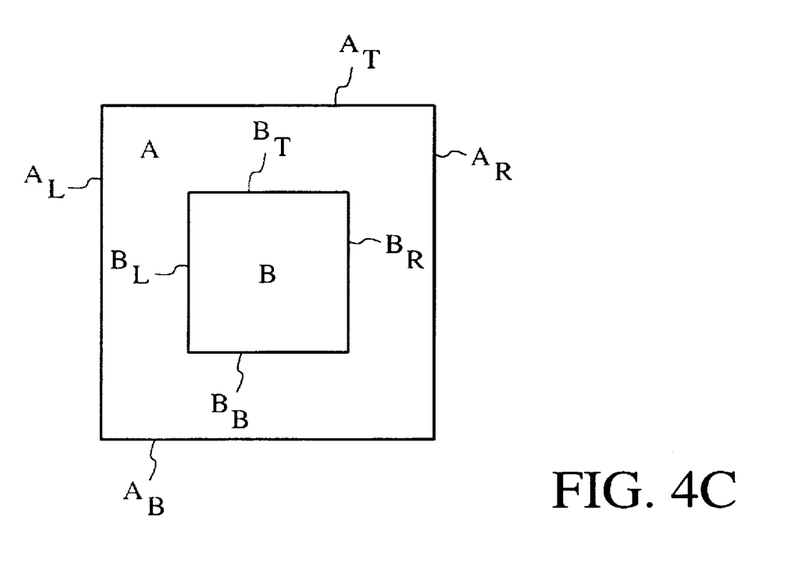

An important and repeatedly performed task in graphics processing is to determine relationships between two objects in order to fill the frame buffer with the image accordingly. Three common relationships between the objects are whether they intersect, overlap, or contain one another. The three relationships are shown in FIGS. 4A, 4B, and 4C, respectively, using two rectangles A and B as example objects. Both rectangles A and B are defined by a top side, a bottom side, a left-hand side, and a right-hand side, as shown. Given the sides of each rectangle, the relationships between two rectangles A and B are determined by the functions rectangles-intersect, rectangles-overlap, and rectangle-contains-rectangle.

The function rectangle-intersect(A, B) returns true if the rectangles A and B intersect. The rectangles A and B are shown intersecting in FIG. 4A. Two rectangles are determined to intersect when the following boolean expression is true:

$B_L >= A_R$ & $B_T <= A_B$ & $B_R >= A_L$ & $B_B >= A_T$

The function Rectangles-overlap(A, B) is closely related to rectangle-intersect function and returns true (1) if A and B overlap by one pixel. FIG. 4B shows two examples of how rectangles A and B may overlap. The two rectangles overlap when the following boolean expression is true:

$B_L > A_R$ & $B_T < A_B$ & $B_R > A_L$ & $B_B > A_T$

The third function, rectangle-contains-rectangle (A, B), returns true if rectangle A contains rectangle B. This situation is shown in FIG. 4C. Rectangle A contains rectangle B according to the boolean expression:

$A_T >= B_T$ & $A_L >= B_L$ & $A_R <= B_R$ & $A_B <= B_B$

The rectangles-intersect function, the rectangles-overlap function, and rectangle-contains-rectangle function are each typically written using four branch instructions. When written using boolean expressions, as described above, the "&" (AND) instructions are unable to execute until the results of the comparisons between the rectangle boundaries are known.

According to the present invention, the rectangles-intersect function, the rectangles-overlap function, and rectangle-contains-rectangle function are written without any branch instructions using the inline compare.

Figure 5:
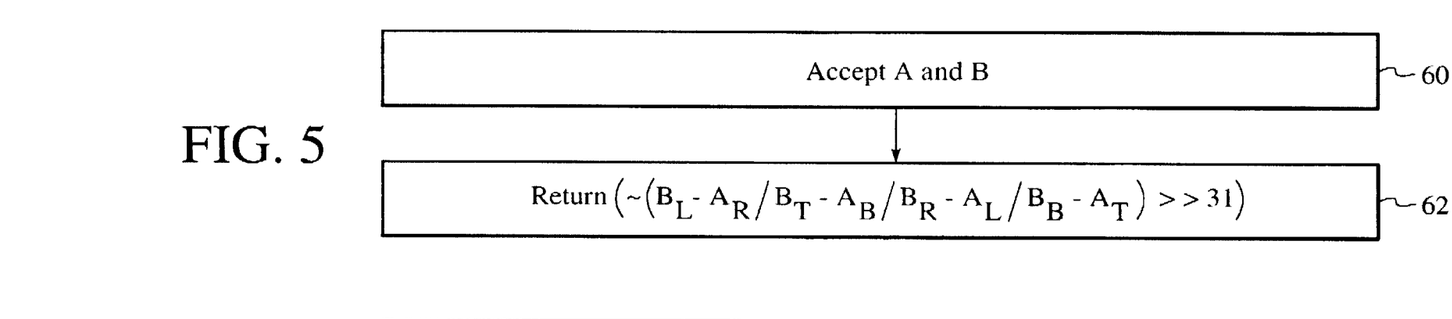
FIG. 5 is a flowchart of the rectangles-intersect function of the present invention.

Referring now to FIG. 5, a flowchart of the rectangles-intersect(A, B) function of the present invention is shown. The function accepts the boundaries of rectangles A and B as inputs in step 60. In step 62, the comparison between the boundary of A and boundary of B is encoded as the boolean inline compare expression:

$(\tilde{}(B_L - A_R | B_T - A_B | B_R - A_L | B_B - A_T)) >> 31$ and the function returns the result of the inline compare. If the result of each subtraction is positive, the rectangles intersect and the function returns true (1). If A and B do not intersect the function returns false (0).

Figure 6:
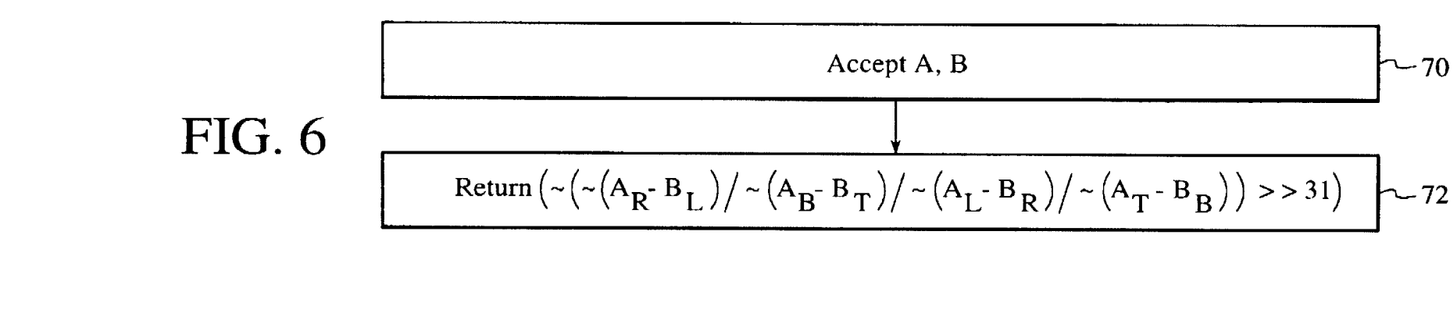
FIG. 6 is a flowchart of the rectangles-overlap function of the present invention.

Referring now to FIG. 6, a flowchart of the rectangles-overlap(A, B) function of the present invention is shown. The function accepts rectangles A and B as inputs in step 70, and in step 72, the comparison between the boundary of A and boundary of B is encoded as the boolean inline compare expression:

$(\tilde{}(\tilde{}(A_R - B_L) | \tilde{}(A_B - B_T) | \tilde{}(A_L - B_R) | \tilde{}(A_T - B_B))) >> 31$ and the function returns the result of the inline compare. The expression return true (1) if A and B overlap, and returns false (0) otherwise.

Figure 7:
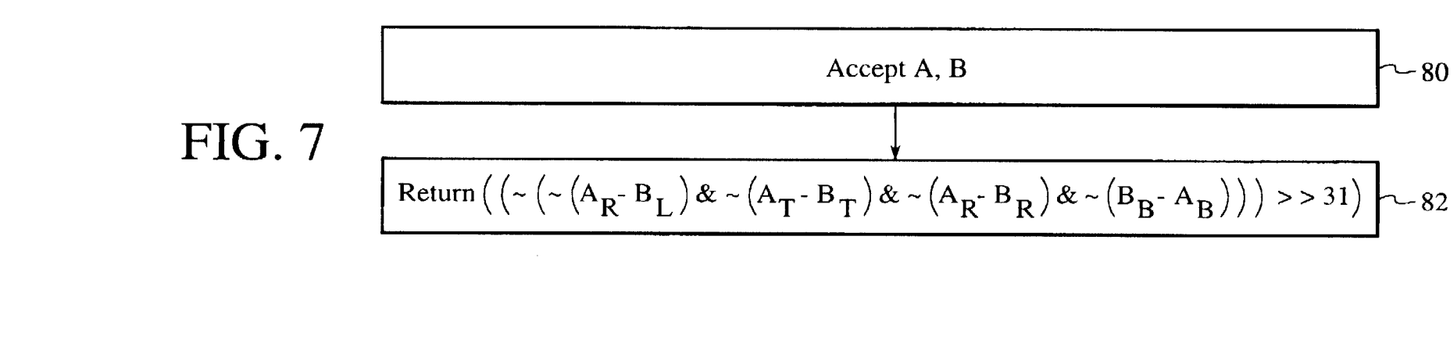
FIG. 7 is a flowchart of the rectangle-contains-rectangle function of the present invention.

Referring now to FIG. 7, a flowchart of the rectangle-contains-rectangle(A, B) function of the present invention is shown. The function accepts rectangles A and B as inputs in step 80, and in step 82, the comparison between the boundary of A and boundary of B is encoded as the boolean inline compare expression:

$(\tilde{}(\tilde{}(A_R - B_L) \& \tilde{}(A_T - B_T) \& \tilde{}(A_R - B_R) \& \tilde{}(B_B - A_B))) >> 31$ and the function returns the result of the inline compare. The expression returns true (1) if A contains B, and returns false (0) otherwise.

Encoding the comparison of the rectangle boundaries as an inline compare instruction allows the graphic functions of the present invention to execute twice as fast as traditional functions due to the elimination of the four branch instructions.

The method of the present invention may also be applied to non-graphic software functions, such as a conventional binary search function, for example. A conventional binary search function searches for a key in an ordered list of items by dividing the list into two parts at the midpoint. The value of the key is compared to the value of the item located at the midpoint. If the value of the key equals the value of the item, then the key has been found and the search is over. If the value of the key is less than the value of the item, then the key is located in the upper half of the list. If the value of the key is greater than the value of the item, then the key is located in the lower half of the list. The appropriate half of the list is then divided again and the search proceeds.

S According to the present invention, the use of branch instructions in a conventional binary search function is replaced with an inline compare instruction, as follows:

(item−key)>>31 where the value of key is subtracted from the value of the item located at the midpoint. The result of the inline compare is 0 when item is greater than key, and 1 when the item is less than key. The result of inline compare is then used to encode the decision of whether the upper or lower half of the list should be searched. If the current location in the list is represented by a variable called "listpointer", then the value of listpointer can be updated to a new location in the list by the boolean expression:

listpointer:=listpointer+(searchsize/2&~(item−key)>>31)

where searchsize is the number of elements in the current list. When the value of the key is greater than the value of item, the parenthetical expression is 0, and listpointer remains unchanged because the key is in the upper half of the list. When the value of the key is less than the value of item, the parenthetical expression is 1, and listpointer is updated to the midpoint of the list because the key is in the lower half of the list.

A binary search function written according to the present invention executes faster than conventional binary search functions due to the elimination of branch statements. To implement the binary search function of the present invention, the list must be conditioned so that the number of items in the list is a power of two where the exponent is an integer. The list may then be divided using a logical shift instruction:

searchsize>>1

Initially, searchsize equals the number of elements in the list. If the number of elements in the list is sixteen, then the shift-right divides the list at the midpoint, and searchsize becomes eight A method and system has been disclosed for improving execution speed of software functions by reprogramming conventional software functions with inline compare and inline choice instructions. The inline compare and inline choice instructions reduce processor stalls by eliminating compare/branch instruction sequences. Software written according the present invention is intended to reside in some form of computer readable medium, such as memory or disk, and compiled and executed by a processor.

Although the present invention has been described in accordance with the embodiments shown, one of ordinary skill in the art will readily recognize that there could be variations to the embodiments and those variations would be within the spirit and scope of the present invention. For example, the inline compare and inline choice instructions of the present invention may be used in any software function where and "if" instruction is followed by a selection instruction. Accordingly, many modifications may be made by one of ordinary skill in the art without departing from the spirit and scope of the appended claims.

What is claimed is:

1. A method for reducing processor stalls when executing a software function, the function including a plurality of instructions, the method comprising the steps of:

encoding a comparison between a first value and a second value in a first instruction, the first instruction providing a result of the comparison, wherein the encoding step includes the step of performing an arithmetic shift instruction; and using the result of the comparison to indicate if the first and second value are in a predetermined relationship, wherein the comparison in the software function executes sequentially, and wherein the encoding and using steps reduce processor stalls.

2. A method as in claim 1 wherein the encoding step is an inline compare instruction.

3. A method as in claim 2 wherein the encoding step further includes the step of encoding the result of the comparison in a boolean expression.

4. A method as in claim 3 wherein the encoding step includes the step of subtracting the second value from the first value.

5. A method as in claim 1 wherein the first and second values are N bits in length and wherein the step of performing an arithmetic shift instruction comprises a shift-left of N−1 bits.

6. A method as in claim 5 wherein the software function is a binary search.

7. A method as in claim 1 wherein the using step is an inline choice instruction.

8. A method as in claim 7 wherein the predetermined relationship includes the first value being numerically equal, numerically smaller, and numerically larger than the second value.

9. A method as in claim 8 wherein the using step further includes the step of selecting the first value or the second value based on the result of the comparison.

10. A method for improving execution speed of a computer implemented software function, the method comprising:

encoding a compare operation between a first variable and a second variable in a first software instruction, the first software instruction providing a result of the comparison;

setting a mask value equal to the result; and selecting one of the first variable and the second variable based on the value of the mask in a second instruction, the selection being performed via an inline choice, and wherein the steps of encoding, setting, and selecting improve execution speed of a computer.

11. A method as in claim 10 wherein the computer implemented function is a minimum value function.

12. A method as in claim 11 wherein the setting step further includes the step of setting the mask value to select a numerically smaller value of the first variable and the second variable.

13. A method as in claim 10 wherein the computer implemented function is a maximum value function.

14. A method as in claim 13 wherein the setting step further includes the step of setting the mask value to select a numerically larger value of the first variable and the second variable.

15. A method as in claim 10 wherein the encoding step further includes the step of encoding the result of the comparison in a boolean expression.

16. A method as in claim 15 wherein the encoding step further includes the step of performing a boolean AND between the mask and the first variable.

17. A method as in claim 16 wherein the encoding step further includes the step of performing a boolean AND between the mask and the second variable.

18. A computer software method for determining if a first object having a first boundary and a second object having a second boundary are in a predetermined relationship without executing a branch instruction, the method comprising the steps of:

encoding a comparison between the first boundary of the first object and the second boundary of the second object using an inline compare, wherein the inline compare provides a result of the comparison;

using the result of the comparison to indicate if the first and second object are in the predetermined relationship; and filling a buffer in a manner according to the predetermined relationship.

19. A method as in claim 18 wherein the predetermined relationship between the first and second object comprises the first object intersecting the second object.

20. A method as in claim 19 wherein the predetermined relationship between the first and second object comprises the first object containing the second object.

21. A method as in claim 20 wherein the predetermined relationship between the first and second object comprises the first object and the second object overlapping.

22. A computer readable medium containing program instructions for:

encoding a comparison between a first value and a second value in a first instruction, the first instruction providing a result of the comparison, wherein the encoding step includes the step of performing an arithmetic shift instruction; and using the result of the comparison to indicate if the first and second value are in a predetermined relationship, wherein the comparison in the program executes sequentially.

23. A computer readable medium as in claim 22 wherein the encoding instruction is an inline compare instruction.

24. A computer readable medium as in claim 23 wherein the encoding instruction further includes the instruction of encoding the result of the comparison in a boolean expression.

25. A computer readable medium as in claim 24 wherein the encoding instruction includes the instruction of subtracting the second value from the first value.

26. A computer readable medium as in claim 25 wherein the encoding instruction further includes the instruction of performing an arithmetic shift instruction.

27. A computer readable medium as in claim 26 wherein the first and second values are N bits in length and wherein the instruction of performing an arithmetic shift instruction comprises a shift-left of N−1 bits.

28. A computer readable medium as in claim 22 wherein instruction is an inline choice instruction.

29. A computer readable medium as in claim 28 wherein the predetermined relationship includes the first value being numerically equal, numerically smaller, and numerically larger than the second value.

30. A computer readable medium as in claim 29 wherein instruction further includes the instruction of selecting the first value or the second value based on the result of the comparison.

* * * * *